United States Patent Office 3,419,542
Patented Dec. 31, 1968

3,419,542
AZO DYESTUFFS CONTAINING A
UREIDO GROUP
Fritz Meininger, Frankfurt am Main, and Helmut Steuernagel and Heinrich Frölich, Kelkheim (Taunus), Germany, assignors to Farbwerke Hoechst Aktiengesellschaft vormals Meister Lucius & Bruning, Frankfurt am Main, Germany, a corporation of Germany
No Drawing. Filed Sept. 24, 1965, Ser. No. 490,081
Claims priority, application Germany, Sept. 24, 1964,
F 44,046
10 Claims. (Cl. 260—195)

ABSTRACT OF THE DISCLOSURE

Azo-dyestuffs having the general formula

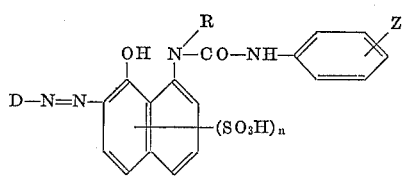

wherein D represents a radical of a diazo component, R represents hydrogen or lower alkyl, n stands for 1 or 2 and Z represents a reactive group, and complex metal compounds of the aforesaid azo-dyestuffs wherein the radical D contains a substituent capable of being metallized in ortho-position to the azo-linkage useful in dyeing cellulose textiles with high tinctorial strength, purity of shade, good light fastness and resistance to washing.

---

The present invention relates to new valuable azo dyestuffs and their metal complex compounds as well as to a process for preparing them; in particular, the invention provides azo dyestuffs which in their metal-free and acid form correspond to the following formula

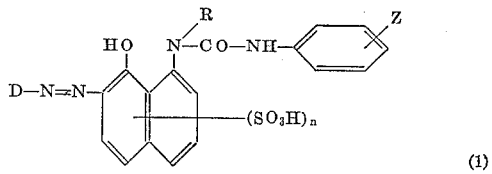

wherein D represents the radical of a diazo component which may contain additional substituents, in particular groups imparting solubility in water and, if desired, azo groups, R represents a hydrogen atom or an alkyl radical, n stands for 1 or 2, Z represents a group of one of the formulae $$-SO_2-CH=CH_2 \qquad (2)$$

$$-SO_2-CH_2-CH_2-X \qquad (3)$$

and X represents an inorganic or organic radical which may be split off by an alkaline agent.

The hitherto unknown dyestuffs of Formula 1 can be prepared by known methods and may be converted, if desired, into their metal complex compounds likewise by known methods, provided the metal-free dyestuffs obtained in this manner contain in ortho-position to the azo bridge a hydrogen atom or a substituent capable of forming metal complexes or of being converted into a substituent of this kind.

As radical D of a diazo component which participates in the formation of the azo dyestuffs of the general Formula 1 obtainable according to the process of the present invention there may be mentioned, for example, a radical of the benzene, naphthalene, azobenzene, azonaphthalene, benzene-azonaphthalene, diphenyl, diphenylamine, pyrene, dehydrothiotoluidine or stilbene series.

The solubilizing groups which may be contained in said radical D of the diazo component are in the first place strongly acid groups imparting solubility in water such, for example, as sulfonic acid or carboxylic acid groups, moreover low-molecular alkylsulfonyl groups as well as sulfonic acid amide groups or carboxylic acid amide groups. In addition, the radical D may contain further substituents which are usually present in azo dyestuffs, for instance halogen atoms such as chlorine or bromine atoms, lower alkyl, lower alkoxy, acyl, acylamino, arylamino, hydroxy, nitro, cyano and trifluoromethyl groups as well as heterocyclic radicals. These groups may be linked in any position to the diazo component and may be distributed on the annulated rings.

As inorganic or organic radicals X which are split off by the action of alkaline agents there may be mentioned for example the following: halogen atoms such as a chlorine or bromine atom, an alkyl-sulfonic acid ester group or arylsulfonic acid ester group, moreover acyloxy groups such as an acetoxy group, furthermore a sulfuric acid or thiosulfuric acid ester group as well as a phenoxy group or a dialkylamino group such, for example, as a dimethyl- or diethylamino group.

The preparation of the new metal-free azo dyestuffs of the general Formula 1 by coupling is advantageously carried out by treating the diazonium compound of an aromatic amine with a coupling component of the general formula

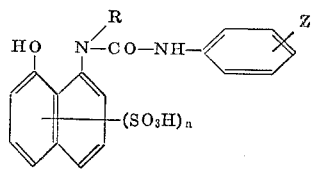

in which R, Z and n have the meanings given above.

The coupling of the coupling components of Formula 4 with diazotized amines according to the process of the invention can be carried out by known methods in particular under weakly acid, neutral or weakly alkaline conditions. Especially when coupling in a weakly alkaline range it is advisable to operate at the lowest temperature possible—preferably below 40° C.—in order to avoid undesirable side reactions which may cause, in particular, the loss of substituent X or the addition of water to the double linkage of the vinylsulfonyl group.

The above-mentioned diazonium compounds of primary aromatic amines which are used as starting substances in the process of the present invention can be obtained from the corresponding amines by known methods, for example by treatment with sodium nitrite in the presence of mineral acids, in particular in the presence of hydrochloric acid. The diazotization may likewise be effected by means of nitrosylsulfuric acid or in the presence of α-naphthalenesulfonic acid.

The following amines may serve as examples of diazotizable amines suitable for use in the process of the present invention:

1-aminobenzene,
1-aminobenzene-2-sulfonic acid,
1-amino-benzene-3-sulfonic acid,
1-aminobenzene-4-sulfonic acid,
1-aminobenzene-2,5-disulfonic acid,
1-amino-4-chlorobenzene-2-sulfonic acid,
1-amino-4-methyl-5-chlorobenzene-2-sulfonic acid,
1-amino-4-methylbenzene-2-sulfonic acid,
1-amino-3-trifluoromethylbenzene-6-sulfonic acid,
1-amino-3,4-dichlorobenzene-6-sulfonic acid,
1-amino-4-methoxy-benzene-6-sulfonic acid,
1-amino-3-methoxybenzene-6-sulfonic acid,
1-amino-3-methylbenzene-4-sulfonic acid, moreover, ortho, meta- and para-toluidine, ortho-anisidine, chloro- and nitroaniline, 1-aminobenzene-3-carboxylic acid and
1-aminobenzene-6-carboxylic acid,
1-amino-3-(2',4'-dichlorotriazinyl-6')aminobenzene-6-sulfonic acid,
1-aminonaphthalene-4-sulfonic acid,
1-aminonaphthalene-5-sulfonic acid,
1-aminonaphthalene-6-sulfonic acid and
1-aminonaphthalene-7-sulfonic acid,
2-aminonaphthalene-4-sulfonic acid,
2-aminonaphthalene-6-sulfonic acid,
2-aminonaphthalene-7-sulfonic acid and
2-aminonaphthalene-8-sulfonic acid,
2-aminonaphthalene-1-sulfonic acid,
1-amino-naphthalene-3,6-disulfonic acid,
2-aminonaphthalene-1,5-disulfonic acid,
2-aminonaphthalene-3,6-disulfonic acid,
2-aminonaphthalene-4,8-disulfonic acid,
2-aminonaphthalene-5,7-disulfonic acid,
2-aminonaphthalene-6,8-disulfonic acid,
1-(3'- or 4'-aminobenzoyl)-aminobenzene-3-sulfonic acid,
3-aminopyrene-5,8-disulfonic acid and
3-aminopyrene-5,10-disulfonic acid,
4-nitro-4'-amino-stilbene-2,2'-disulfonic acid and
dehydrothiotoluidinesulfonic acids as well as primary aromatic amines containing azo groups, for instance 4-amino-azobenzene-(1,1')-2,4'-disulfonic acid.

If conversion of the metal-free azo dyestuffs obtained according to the process of the invention into their metal complex compounds is desired the following diazotizable amines may be used for example:

2-aminobenzene-1-carboxylic acid-4-sulfonic acid,
2-aminobenzene-1-carboxylic acid-5-sulfonic acid,
2-aminobenzene-1-carboxylic acid,
nitroaminobenzene-carboxylic acids or
aminohydroxybenzenes such as
4-methyl-, 4-chloro- or 4-nitro-2-amino-1-hydroxybenzene,
6-acetylamino-, 6-chloro- or 6-nitro-2-amino-1-hydroxybenzene-4-sulfonic acid,
2-amino-1-hydroxybenzene-4-sulfonic acid,
2-amino-1-hydroxybenzene-5-sulfonic acid,
4-nitro-6-acetylamino-2-amino-1-hydroxybenzene,
4-nitro-6-chloro-2-amino-1-hydroxybenzene,
4-chloro- or 4-nitro-2-amino-1-hydroxybenzene-6-sulfonic acid,
4,6-dinitro- or 4,6-dichloro-2-amino-1-hydroxybenzene,
2-amino-1-hydroxybenzene-4-sulfonic acid amide or
2-amino-1-hydroxybenzene-5-sulfonic acid amide and
3-amino-2-hydroxybenzene-1-carboxylic acid-5-sulfonic acid, The above-mentioned coupling components of the general Formula 4 which may be used for the coupling, if desired in the form of their alkali metal salts, can be prepared in simple manner by reacting naphthalene derivatives of the general formula

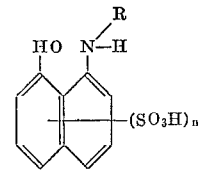

(5)

which contain an amino group capable of being acylated, with isocyanates or carbamic acid derivatives of the general formulae

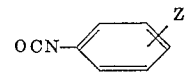

(6)

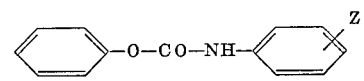

(7)

wherein R, Z and $n$ are defined as above.

The isocyanates of Formula 6 and the carbamic acid derivatives of Formula 7 are new compounds which can be obtained from the corresponding arylamines, for instance by reaction of the amino group with phosgen or by condensation with chloroformic acid phenylester.

Among the naphthalene derivatives of Formula 5 which are suitable for use in the process of the invention there may be mentioned, for example 1-amino-8-hydroxy-naphthalene-3-sulfonic acid,
1-amino-8-hydroxynaphthalene-4-sulfonic acid,
1-amino-8-hydroxynaphthalene-6-sulfonic acid,
1-amino-8-hydroxynaphthalene-3,6-disulfonic acid,
1-amino-8-hydroxynaphthalene-4,6-disulfonic acid and
1-(N-ethylamino)-8-hydroxynaphthalene-3,6-disulfonic acid.

Suitable isocyanates and carbamic acid derivatives of Formula 6 or 7 respectively which may be used for the reaction with the naphthalene derivatives of Formula 5 are for example 4-vinylsulfonylphenyl-1-isocyanate,
3-vinylsulfonylphenyl-1-isocyanate,
4-(β-chloroethylsulfonyl)-phenyl-1-isocyanate,
3-(β-chloroethylsulfonyl)-phenyl-1-isocyanate,
2-(β-chloroethylsulfonyl)-phenyl-1-isocyanate, moreover β - hydroxyethylsulfonyl - phenylisocyanates wherein the hydroxy group in β-position is esterified for example with methane-sulfonic acid, benzene-sulfonic acid, para-toluene-sulfonic acid or acetic acid, 3- or 4-(β-phenoxy-ethylsulfonyl)-phenyl-1-isocyanate as well as the condensation products of 1 mol of chloroformic acid phenylester with 1 mol of 3- or 4-aminophenyl-1-(β-sulfatoethyl)-sulfone.

If the amines, the diazo compounds of which are used for the preparation of the metal-free dyestuffs of Formula 1 contain in ortho-position to the amino group a grouping capable of forming metal complexes or of being converted into such a grouping, for example a carboxyl group, a hydroxy group or an alkoxy group such as a methoxy group, the metal-free dyestuffs obtained which correspond to Formula 1 can be transformed by known methods into their metal complexes, for example their copper, nickel, chromium or cobalt complexes. For the preparation of the metal complex compounds the o,o'-dihydroxy-azodyestuffs or o-carboxy-o'-hydroxy-azo dyestuffs obtainable according to the process of the present invention are reacted with an agent yielding metal. If desired, the metal complex compounds of o,o'-dihydroxy-azo dyestuffs can also be obtained in an indirect manner by coppering o-alkoxy-o'-hydroxy-azo dyestuffs with dealkylation or by treating o'-hydroxy-azo dyestuffs which contain a hydrogen atom in ortho-position to the azo bridge in a weakly acid solution with copper salts and with an oxidizing agent. Subsequently, the copper complex compounds obtained in this manner can be de-coppered, if desired, for example by treatment with mineral acids, and then converted into the metallized o,o'-dihydroxy-azo dyestuffs by means of another agent yielding metal.

As agents yielding metal there may be used according to the process of the invention compounds which yield copper, nickel, chromium or cobalt. Suitable for this purpose are, for example, the salts of the metals cited, for instance chromium sulfates, cobalt acetate, cobalt sulfate, copper acetate or copper sulfate. There may, however, also be used metallizing agents containing complex-bound metal, such as for example complex chromium or cobalt compounds of aliphatic hydroxycarboxylic acids or dicarboxylic acids and chromium complex compounds of aromatic o-hydroxycarboxylic acids such, for example, as salicylic acid, moreover complex cobalt or copper compounds of the alkali metal salts of aliphatic hydroxycarboxylic acids. Suitable aliphatic hydroxycarboxylic acids are, for example, citric acid, lactic acid, glycolic acid, and above all, tartaric acid.

The reaction of the metal-free azo dyestuffs of the general Formula 1 with the agents yielding metal is advantageously carried out in the heat. It is expedient to heat the aqueous metallization mixture in a weakly acid to neutral range to temperatures between 20° C. and 130° C., if desired under reflux or in a closed vessel. If necessary, organic solvents such as alcohol or dioxane may be added or the reaction may be carried out in the presence of further agents accelerating the formation of complexes such, for example, as the salts of organic acids.

The metal complex dyestuffs obtainable according to the process of the present invention may contain one complex-bound metal atom each in 1 or 2 dyestuff molecules. In the case of chromium or cobalt the molar ratio of the metal to the azo dyestuff is preferably 1:2, whereas the complex compounds obtained with the use of agents yielding copper or nickel contain one metal atom per molecule of dyestuff.

The formation of the dyestuffs of the general Formula 1 can likewise be achieved by reacting metal-free azo dyestuffs of the general formula

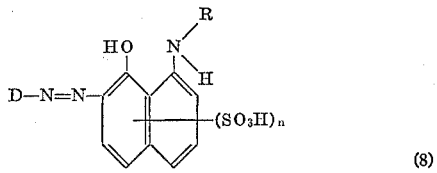

(8)

wherein D, R and $n$ are defined as above and which contain an amino group capable of being acylated, with isocyanates of Formula 6. If desired, the metal-free dyestuffs obtained—provided they contain in ortho-position to the azo bridge a hydrogen atom or a substituent capable of forming metal complexes or of being converted into a substituent of this kind—may then be converted by a further reaction step into their metal complex compounds. The necessary starting substances of Formula 8 can be obtained in simple manner by coupling the diazonium compound of any aromatic amine with a coupling component of Formula 5.

According to a particular variation of the process described for the manufacture of metal complex dyestuffs of Formula 1 it is advantageous to metallize the starting substances of Formula 8—provided they meet the above-mentioned requirements for the formation of metal complexes—according to known methods, prior to the reaction with the isocyanates of Formula 6.

The reaction described above is preferably carried out by adding an isocyanate of Formula 6 at a relatively low temperature, advantageously within the range from about −5° to +30° C., and with stirring, to the aqueous solution of the metal-free starting dyestuff of Formula 8, which contains an amino group capable of being acylated, or the metal complex compound thereof, the solution showing a weakly alkaline or weakly acid, preferably a neutral reaction. The acylating components of Formula 6 can be used as such, for example in the form of a powder, if desired with addition of an emulsifier in order to obtain a better degree of dispersion in the aqueous phase, or dissolved in a suitable organic solvent such as benzene, toluene, chlorobenzene or acetone.

A further variation of the process of the invention consists in subjecting the grouping Z of the metal-free azo dyestuffs of Formula 1 obtained according to the process of the invention as well as of their metal complex compounds or, above all, of the coupling components of Formula 4 used for the preparation of said dyestuffs, prior to the coupling to further reactions within the limits indicated by the groups of Formulae 2 and 3. Thus it is possible, for instance, to convert the vinylsulfonyl group of Formula 2 by reaction with a salt of thiosulfuric acid in a weakly acid aqueous medium into a β-thiosulfatoethylsulfonyl group corresponding to the above Formula 3, or to modify the substituent X of Formula 3, for example by exchanging a halogen atom against a dialkylamino group.

The products of the invention may be isolated from the medium in which they were formed either in their metal-free form or as complex compounds, according to known methods, for example in the form of an alkali metal salt by salting out with sodium or potassium chloride, or by spray-drying of the neutralized reaction mixture.

In the form of their alkali metal salts the dyestuffs obtained according to the process of the invention are soluble in water and may be used for dyeing and printing various kinds of materials, for example silk, wool, leather, synthetic polyamides and polyurethanes, regenerated protein and cellulose materials, in the first place, however, cotton, linen and viscose rayon. The metal-free monoazo dyestuffs obtainable according to the process of the invention are of particular value in that they are excellently suitable for the preparation of fast red dyeings, in particular on textiles made of cellulose. The new dyestuffs are applied to the material to be dyed in the presence of acid-binding agents according to the dyeing and printing processes generally used in industry. They may also be used for the dyeing of wool, silk, regenerated proteins, polyamides and modified acrylonitrile materials according to the usual dyeing processes in weakly acid, neutral or weakly alkaline dyestuff solutions. The dyeings and prints obtained with the use of these dyestuffs are usually distinguished by high tinctorial strength, purity of shade, a good fastness to light and especially by a very good resistance to washing.

If the dyestuffs contain groups capable of forming metal complexes, for example o-hydroxy-o'-carboxy groups, o,o'-dihydroxy groups or o-hydroxy-carboxy groups which are present for example in salicylic acid derivatives, the metal-free dyeings may be treated on the material with agents yielding metal.

The following examples illustrate the invention but they are not intended to limit it thereto, the parts and percentages being by weight unless otherwise mentioned and the relationship of parts by weight to parts by volume being the same as that of the kilogram to the liter.

Example 1

223 parts of 1-amino-8-hydroxynaphthalene-3,6-disulfonic acid are dissolved in 700 parts by volume of water while adding sodium carbonate to give a neutral solution. Into the solution thus obtained which has been cooled to 0° to +5° C. a solution of 206.5 parts of 3-(β-chloroethylsulfonyl)-phenyl-1-isocyanate (melting point 81° C.) in 415 parts of acetone is introduced within one hour while stirring at a pH-value of 6.5–7.0. When the reaction is complete the mixture is diluted with 5,000 parts by volume of water, 20 parts of kieselguhr are added, stirring is continued for about 15 minutes and the mixture is filtered. The product is then salted out with sodium chloride, filtered and washed with a dilute aqueous sodium chloride solution. There is obtained, in a good yield, the disodium salt of a coupling component which in the form of its free acid corresponds to the following formula

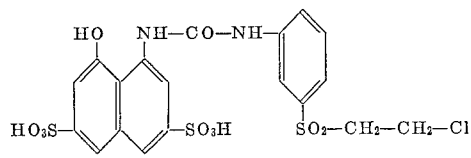

A part of the saline filter residue which corresponds to 56.5 parts of the coupling component of the above formula in the form of its free acid, is dissolved in 1,000 parts by volume of water and combined, at 0° to 10° C., with an ice-cold solution of a diazonium salt obtained from 9.3 parts of 1-aminobenzene, 24 parts of 37% hydrochloric acid, 100 parts of ice and 7.0 parts of sodium nitrite. The pH-value of the coupling mixture is adjusted to 6–7 by addition of sodium carbonate. When the coupling is complete sodium chloride is added to the mixture; the dyestuff which has been salted out is filtered, washed with dilute sodium chloride solution and dried in vacuo at 50° C. In the form of its free acid the dyestuff corresponds to the following formula

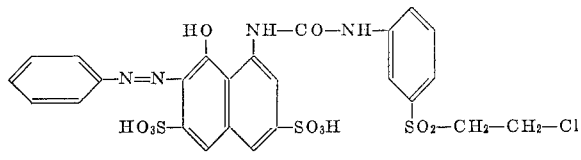

The dyestuff obtained is a dark red, water-soluble powder which according to the direct dyeing or the pad-dyeing method dyes cotton strong red shades fast to washing and to light.

The new dyestuff is also suitable for dyeing polyamide fibers and wool in an acid bath, bright red shares of good fastness to light and to washing.

Example 2

15.95 parts of 1-amino-8-hydroxynaphthalene-4,6-disulfonic acid are dissolved in 100 parts by volume of water, while adding sodium hydroxide solution, to give a neutral solution. 12.5 parts of finely pulverized 4-vinylsulfonyl-phenyl-1-isocyanate (melting point 61° C.) are strewed into the solution at 0° to 10° and at a pH-value of 6.5 to 6.8, while vigorously stirring. As soon as no more starting material is detectable the mixture is diluted with 100 parts by volume of water and filtered at 20° C. The filtrate which contains the coupling component of the following formula

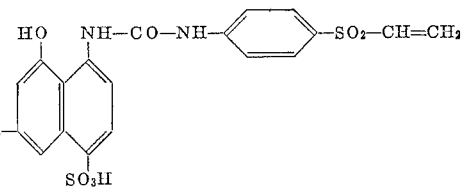

in the form of the disodium salt, is cooled to 0°–10° C. and combined with an aqueous solution of the diazonium compound of 8.65 parts of 1-aminobenzene-4-sulfonic acid. The pH-value of the coupling mixture is then adjusted to 6–7 by means of sodium bicarbonate and when the coupling is complete sodium chloride is added. The precipitated trisodium salt of the dyestuff which in the form of the free acid corresponds to the following formula

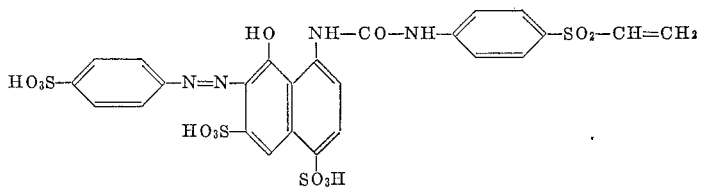

is filtered, washed with dilute sodium chloride solution and dried. It is a red powder which produces brilliant red prints on cotton having a good fastness to wet processing and to light.

When the coupling component prepared as described above is treated with sodium thiosulfate in a weakly acid aqueous solution or reacted in an alkaline medium with diethylamine prior to coupling it with 1-aminobenzene-4-sulfonic acid and the process is continued as described above, there are obtained the dyestuffs of the following formula

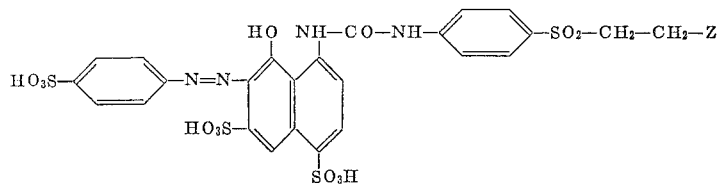

wherein Z represents a thiosulfuric acid ester group or a diethylamino group, which have similar good properties.

The following table contains a number of further azo dyestuffs obtainable according to the process of the invention which can be prepared in the manner described in Examples 1 and 2 by coupling one of the coupling components given in column I with one of the diazo components of column II. The dyestuffs dye cotton by the direct dyeing process or the pad-dyeing process as well as by the printing process the shades specified in column III which are fast to wetting. In the structural formulae of the coupling component $R^1$ represents the grouping

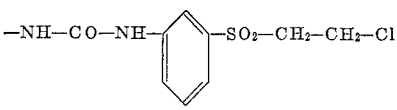

and $R^2$ represents the grouping

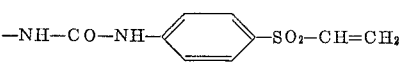

| No. | I Coupling component | II Diazo component | III Tint on cotton |
|---|---|---|---|
| 1 | 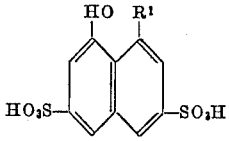 | 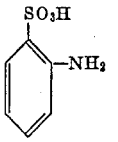 | Red. |
| 2 | Same as No. 1 above | 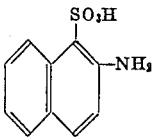 | Bluish red. |
| 3 | do | 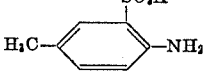 | Do. |
| 4 | do | 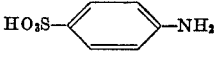 | Do. |
| 5 | do | 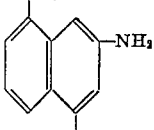 | Do. |
| 6 | do | 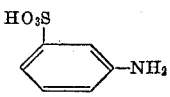 | Red. |
| 7 | 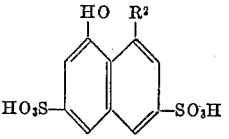 | 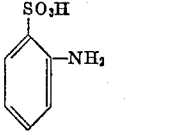 | Do. |
| 8 | Same as No. 7 above | 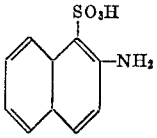 | Bluish red. |
| 9 | do | 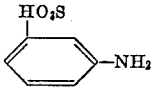 | Red. |
| 10 | do | 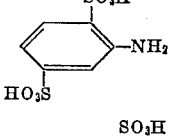 | Red. |
| 11 | do | 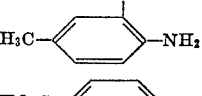 | Bluish red. |
| 12 | do | 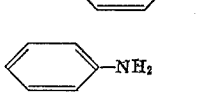 | Do. |
| 13 | do | 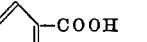 | Red. |
| 14 | do | 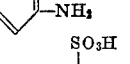 | Do. |
| 15 | do | 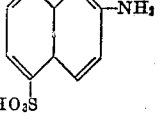 | Do. |

| No. | I Coupling component | II Diazo component | III Tint on cotton |
|---|---|---|---|
| 16 | 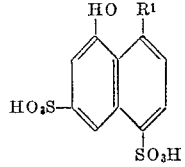 |  | Red. |
| 17 | Same as No. 16 above | 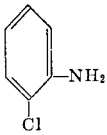 | Do. |
| 18 | ___do___ |  | Bluish red. |
| 19 | ___do___ | 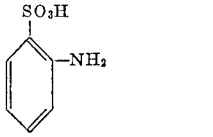 | Red. |
| 20 | ___do___ | 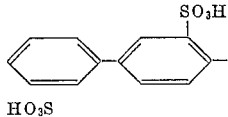 | Bluish red. |
| 21 | ___do___ | 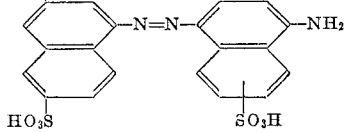 | Greenish blue. |
| 22 | ___do___ | 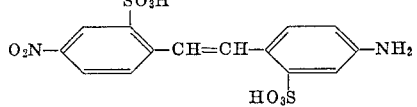 | Violet. |
| 23 | ___do___ | 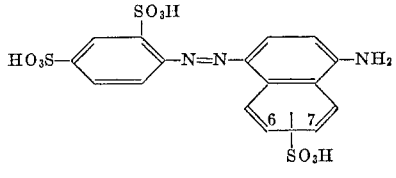 | Blue. |
| 24 | ___do___ | 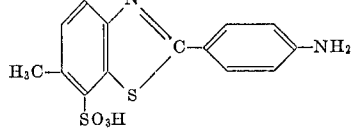 | Red. |
| 25 | ___do___ | 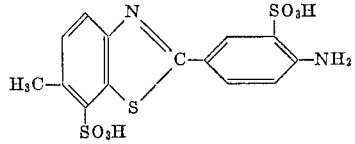 | Do. |
| 26 | ___do___ | 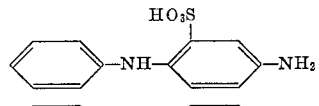 | Blue. |
| 27 | ___do___ | 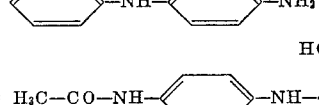 | Do. |
| 28 | ___do___ |  | Do. |

| No. | I Coupling component | II Diazo component | III Tint on cotton |
|---|---|---|---|
| 29 | ...do... | 2-methoxyaniline (OCH₃, NH₂ on benzene) | Bluish red. |
| 30 | ...do... | H₃CO—C₆H₃(SO₃H)—NH₂ | Red. |
| 31 | ...do... | benzene with SO₃H, NH₂, Cl, CH₃ substituents | Do. |
| 32 | ...do... | HO₃S—naphthyl—NH₂ | Do. |
| 33 | ...do... | benzene with SO₃H, NH₂, CF₃ | Do. |
| 34 | ...do... | C₆H₄(SO₃H)—NH—CO—C₆H₄—NH₂ | Do. |
| 35 | ...do... | dichlorotriazinyl-NH-C₆H₃(SO₃H)-NH₂ | Do. |
| 36 | ...do... | C₆H₄(SO₂—NH₂)—NH₂ | Do. |
| 37 | ...do... | naphthalene(SO₃H)₂—N=N—C₆H₃(CH₃)—NH₂ | Violet. |

Example 3

16.0 parts of 1-amino-8-hydroxynaphthalene-3,6-disulfonic acid are dissolved in 300 parts by volume of water at a pH value of 6.5–6.8 while adding sodium hydroxide solution. 19 parts of 2-(β-chloroethylsulfonyl)-phenyl-1-isocyanate (viscous oil) are then added while stirring and stirring is continued for 6 hours at 0–10° C. After addition of 700 parts by volume of water the solution is filtered and the reaction product isolated by salting out with sodium chloride and subsequent filtration.

The moist filter cake obtained is added to a cold diazonium salt solution which is prepared by diazotization of the solution of 4.66 parts of 1-aminobenzene in 50 parts of water and 12 parts of 37% hydrochloric acid with an aqueous solution of 3.45 parts of sodium nitrite. When the coupling is complete the solution is diluted with 1,000 parts by volume of water and the pH value is then adjusted to 6–7 by addition of concentrated sodium carbonate solution. The dyestuff which in the form of the free acid corresponds to the following formula

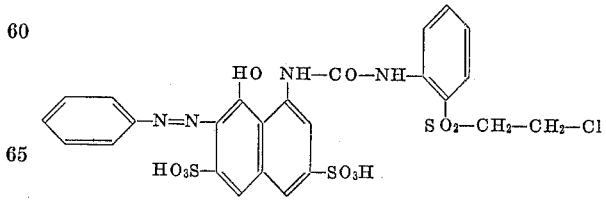

is salted out with sodium chloride in the form of the disodium salt, filtered, washed with dilute sodium chloride solution and dried. There is obtained a dark red powder which dyes cotton in the presence of sodium hydroxide and sodium phosphate bluish red shades fast to washing.

Example 4

16.0 parts of 1-amino-8-hydroxynaphthalene-3,6-disulfonic acid are dissolved in 200 parts by volume of water while adding sodium hydroxide solution to give a neutral solution. 15 parts of 4-(β-chloroethylsulfonyl)-phenyl-1-isocyanate (melting point 100° C.) are introduced in the form of a powder at 0° to 10° C. and the whole is first stirred for 10 hours at 0–10° C. and a pH value of 6–7 and then for another 24 hours at room temperature. Subsequently, 5 parts of kieselguhr are added to the mixture, of 11.1 parts of 2-aminonaphthalene-1-sulfonic acid in 100 parts by volume of water and 18 parts of 37% hydrochloric acid, at 0.5° C., with 3.5 parts of sodium nitrate. The mixture is then stirred at a pH-value of 6–7 until the coupling is complete, the dyestuff is separated by addition of sodium chloride, filtered and dried. In the form of its free acid the dyestuff obtained corresponds to the following formula

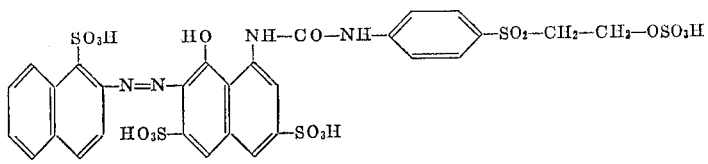

the whole is heated to 40° C. while stirring, and filtered. The product is salted out by addition of sodium chloride, filtered and washed with a dilute sodium chloride solution.

The moist filter residue obtained is added to a diazonium salt solution which is prepared in the following manner: 6.9 parts of aniline-2-carboxylic acid are diazotized at 0–5° C. in 50 parts by volume of water and 12 parts of 37% hydrochloric acid with 3.5 parts of sodium nitrite, and the pH value is then adjusted to 5–6 by means of sodium bicarbonate.

The coupling is allowed to terminate at a pH value of 6 to 7 and the precipitation of the dyestuff formed is then completed by addition of sodium chloride. The product is isolated in the usual manner and dried under reduced pressure at 40° C.

The new dyestuff which corresponds to the following formula

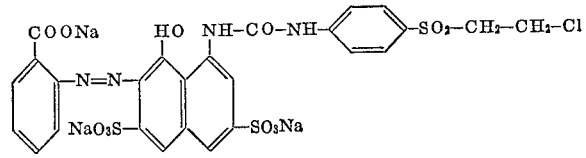

dyes cotton in the presence of sodium hydroxide clear, bluish red shades which show a good fastness to washing.

Example 5

16.0 parts of 1-amino-8-hydroxynaphthalene-3,6-disulfonic acid are dissolved in 200 parts by volume of water while adding sodium hydroxide solution to give a neutral solution. 30 parts of pulverized N-[4-(β-sulfatoethylsulfonyl-phenyl]-1-carbamic acid phenylester (obtained by condensation of chloroformic acid phenylester with 4-aminophenyl-1-β-hydroxyethylsulfone-sulfuric acid ester) are then added to the solution at 50–60° C. and at a pH-value between 6.7 and 7.3, while vigorously stirring. When the 1-amino-8-hydroxynaphthalene-3,6-disulfonic acid is no more detectable in the reaction mixture by paper chromatography, the solution is diluted with 100 parts by volume of water, filtered and the product salted out with sodium chloride. The precipitate is then filtered, washed with a dilute sodium chloride solution and redissolved in 300 parts by volume of water.

The solution of the coupling component obtained in this manner is then combined at 0–10° C. with a neutralized diazonium salt solution which is prepared by diazotization As tetrasodium salt it dissolves readily in water and dyes cotton brilliant bluish shades which are very fast to washing and to light.

The dyestuff of the above formula can also be prepared by reacting the condensation product of 1 mol of 1-amino-8-hydroxynaphthalene-3,6-disulfonic acid and 1 mol of chloroformic acid phenylester in an aqueous solution at a pH-value of 7.0–7.3 and at a temperature of 55–60° C. with 1 mol of 4-aminophenyl-1-(β-hydroxyethyl)-sulfone-sulfuric acid ester. There is obtained the coupling component of the following formula

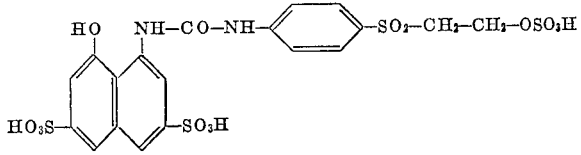

which, after salting out with potassium chloride, is coupled with the corresponding amount of diazotized 2-naphthylamine-1-sulfonic acid.

Example 6

(a) 16.0 parts of 1-amino-8-hydroxynaphthalene-3,6-disulfonic acid are dissolved in 200 parts by volume of water while adding sodium carbonate to give a neutral solution. 13 parts of 3-vinylsulfonyl-phenyl-1-isocyanate (melting point 46° C.) are then introduced in the form of a powder at a pH-value of 6.5–7.0 and at 0–10° C., while stirring vigorously. When the reaction is terminated the condensation mixture is diluted with 100 parts by volume of water and filtered, and sodium chloride is added to the filtrate. The precipitate formed is then filtered and redissolved in 200 parts by volume of water.

(b) 13.2 parts of 4-aminodiphenylamine-3-sulfonic acid are dissolved in 100 parts by volume of water while adding sodium hydroxide solution to give a neutral solution; the solution is then poured onto a mixture of 18 parts of 37% hydrochloric acid and 100 parts of ice and diazotized at 0–5° C. with 3.5 parts of sodium nitrite.

The solution of the coupling component obtained as described in paragraph (a) is then introduced at 0–10° C. into the diazonium salt suspension obtained and the pH-value of the coupling mixture is adjusted to 6–7 by strewing in sodium bicarbonate. The dyestuff formed which in the form of the free acid corresponds to the following formula

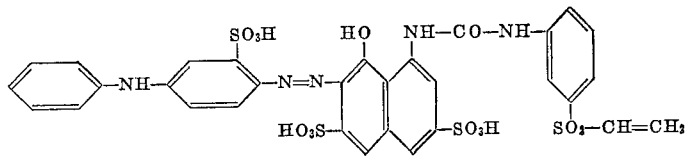

is salted out in the form of the tri-potassium salt by addition of potassium chloride, filtered and dried. The dyestuff obtained dyes cotton blue shades of good fastness to wet processing.

Example 7

12.8 parts of 1-amino-8-hydroxynaphthalene-3,6-disulfonic acid are dissolved in 50 parts by volume of water while adding sodium hydroxide solution to give a neutral solution. 15 parts of 3-(β-phenoxyethylsulfonyl)-phenyl-1-isocyanate (melting point 87° C.) are then strewed in in the form of a powder at 0–10° C. and the reaction mixture is first stirred for 10 hours at 0–10° C. and then for another 24 hours at room temperature and at a pH-value between 6 and 7. The mixture is then diluted with 200 parts by volume of water and filtered, and potassium chloride is added to the filtrate. The precipitate formed is filtered and washed with dilute potassium chloride solution.

The moist filter residue obtained in this manner is then introduced into a diazonium salt solution prepared by diazotization of 6.9 parts of 1-aminobenzene-4-sulfonic acid. The coupling is allowed to take place at 0–10° C. and at a pH-value of 6–7. Finally, the dyestuff formed is salted out in the form of the trisodium salt by addition of sodium chloride, filtered and dried. In the form of the free acid it corresponds to the following formula

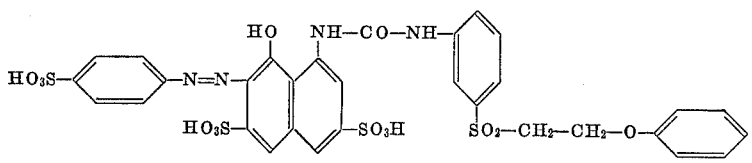

and dyes cotton red shades which are fast to washing.

Example 8

11.2 parts of 6-chloro-2-amino-1-hydroxybenzene-4-sulfonic acid are diazotized in a mixture of 12 parts of 37% hydrochloric acid and 100 parts of ice with 3.5 parts of sodium nitrite. The pH-value of the diazonium salt solution is then adjusted to 6–7 by means of sodium carbonate, and the solution of 28 parts of the coupling component described in Example 1 in 500 parts by volume of water is added. The coupling mixture is stirred for about 24 hours at 0° to 20° C. and at a pH-value of 6.5–7.0 until the coupling is complete, the pH-value is then adjusted to 4–5 by addition of hydrochloric acid, sodium chloride is added and the precipitated metal-free dyestuff is then filtered with suction.

The moist filter cake obtained is stirred into 500 parts by volume of water, an aqueous solution of 12.5 parts of crystallized copper sulfate is added, and the pH-value of the metallization mixture is adjusted to 4.5–5.5 by addition of sodium acetate. The solution is then stirred for about 2 hours at 40° C., subsequently, the pH-value is made up to 6 by means of sodium carbonate, the product is salted out with sodium chloride and filtered. The dyestuff is washed with dilute sodium chloride solution and dried at 50° C. under reduced pressure. In the form of the free acid the metal complex dyestuff corresponds to the following formula

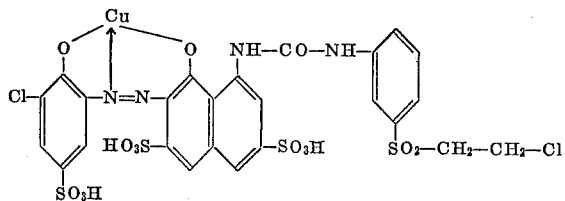

It yields violet dyeings and prints on cotton, having a good fastness to light and to washing.

Example 9

31.9 parts of 1-amino-8-hydroxynaphthalene-3,6-disulfonic acid are dissolved in 400 parts by volume of water while adding sodium hydroxide solution to give a neutral solution. 26 parts of 4-vinylsulfonylphenyl-1-isocyanate are then strewed in in the form of a powder at 0° to 20° C. and at a pH-value of 6.5–6.8. The reaction mixture is stirred until no more free amino groups are detectable, it is then diluted with 400 parts by volume of water and filtered, and the addition product salted out with sodium chloride. The precipitate is filtered and washed with dilute sodium chloride solution.

The moist filter residue obtained is now dissolved in 1,000 parts by volume of water and added to the solution or suspension of the diazonium salt of 15.4 parts of 4-nitro-2-amino-1-hydroxybenzene which has been adjusted to a pH-value of 6–7. The coupling is allowed to terminate at a pH-value of 6.5–7.0, the pH-value of the mixture is then adjusted to 4–5 by means of hydrochloric acid, sodium chloride is added and the precipitated dyestuff is filtered with suction.

The moist filter cake of the metal-free monoazo dyestuff obtained is dissolved in 1,000 parts by volume of water, 25.0 parts of chromium alum are added and the pH-value of the solution is adjusted to 5–6 by addition of sodium acetate. The solution is then stirred at 80° C. until the formation of the chromium complex is terminated. Subsequently, the product is salted out with sodium chloride at room temperature, the chromium complex dyestuff precipitated is filtered and dried in vacuo at 50° C.

The 2:1-chromium complex dyestuff obtained which in its metal-free and acid form corresponds to the following formula

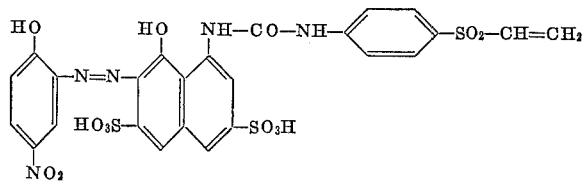

yields bluish grey prints on cotton which are fast to light and to washing.

Example 10

11.96 parts of 1-amino-8-hydroxynaphthalene-6-sulfonic acid are mixed by stirring with 500 parts by volume of water and the whole is neutralized by addition of about 6 parts of 33% sodium hydroxide solution. After cooling to 0–10° C., 15 parts of 3-(β-chloroethylsulfonyl)-phenyl-1-isocyanate in the form of a powder are strewed in and the batch is stirred for 12 hours, while cooling, at a pH-value of 6.5–7.0. If the reaction product contains still unreacted starting product another 15 parts of the isocyanate are introduced and the batch is once more stirred for 12 hours at room temperature and at a pH-value of 6.5–7.0. Subsequently, the whole is diluted with 1,300 parts by volume of water, the solution is filtered and sodium chloride is added to the filtrate. The precipitate of the addition product is filtered with suction and washed with an aqueous sodium chloride solution.

The moist filter cake of the coupling component obtained in this manner is introduced into 200 parts by volume of water, the solution is cooled to 0–5° C. and a diazonium solution is added which is prepared in the following manner: 19 parts of 1-aminonaphthalene-3,5,7-trisulfonic acid are diazotized at 0–5° C. in 200 parts by volume of water and 15 parts of 37% hydrochloric acid with an aqueous solution of 3.5 parts of sodium nitrite. The excess nitrous acid is then decomposed by addition of amidosulfonic acid and the excess acid is neutralized by means of sodium carbonate.

Subsequently, the coupling is allowed to terminate at 0–5° C. and at a pH-value of 6–7. A solution which contains 25 parts of potassium acetate in 80 parts of methanol is added to the coupling mixture until the dyestuff formed, which in the form of the free acid corresponds to the following formula

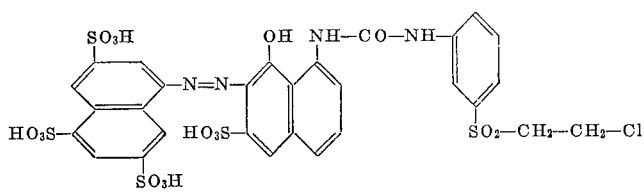

has largely precipitated. The precipitate is filtered with suction, washed with methanol and dried in vacuo at 50° C.

The dyestuff which is obtained in the form of a powder yields reddish violet prints on cotton, having a good fastness to wet processing.

Example 11

11.96 parts of 1-amino-8-hydroxynaphthalene-3-sulfonic acid are dissolved in 200 parts by volume of water at a pH-value of 6–7 while adding a 33% sodium hydroxide solution. A solution of 20 parts of 3-(β-chloroethylsulfonyl)-phenyl-1-isocyanate in 40 parts of chlorobenzene is added at room temperature and the whole is stirred for 24 hours at a pH-value between 6 and 7. The reaction mixture is diluted with 300 parts by volume of water, 10 parts of kieselguhr are added, and the solution is clarified by filteration at 45° C. The addition product formed is salted out with sodium chloride, the precipitate filtered with suction and washed with a dilute aqueous sodium chloride solution.

The filter residue of the coupling component obtained in this manner is dissolved in 500 parts by volume of water and the solution is reacted at 0–5° C. and at a pH-value of 6–7 with the suspension of a diazonium salt which is prepared by the diazotization of 15.1 parts of 2-aminonaphthalene-4,8-disulfonic acid.

When the coupling is complete the dyestuff formed, which in the form of the free acid corresponds to the following formula

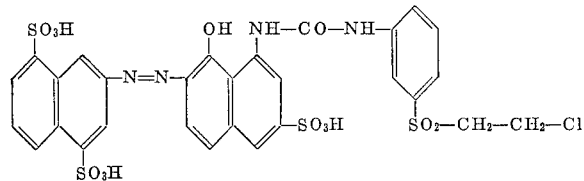

is salted out with sodium chloride, filtered with suction and dried. It produces bluish brown prints on cotton.

Example 12

When using, in Example 11, instead of 1-amino-8-hydroxynaphthalene-3-sulfonic acid the same amount of 1-amino-8-hydroxynaphthalene-4-sulfonic acid and instead of 15.1 parts of 2-aminonaphthalene-4,8-disulfonic acid 12.7 parts of 1-aminobenzene-2,5-disulfonic acid, a dyestuff is obtained which in the form of the free acid corresponds to the following formula

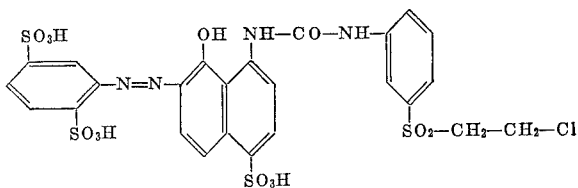

It dyes cotton brown shades which are more reddish than those obtained with the dyestuff prepared according to Example 11.

Example 13

25.3 parts of 1-aminobenzene-2,5-disulfonic acid are dissolved in 200 parts by volume of hot water, the solution being neutralized by addition of 33% sodium hydroxide solution. 25 parts of 37% hydrochloric acid are added and the amino component is then diazotized at 0–5° C. by means of an aqueous solution of 6.9 parts of sodium nitrite. The pH-value of the diazonium mixture is adjusted to 2–3 by strewing in sodium bicarbonate and then combined while stirring at 0–5° C. with the filtered solution of 13.7 parts of 3-amino-4-methoxy-1-methylbenzene in 50 parts by volume of 2 N hydrochloric acid, the pH-value being maintained between 2 and 3 by continuous addition of sodium bicarbonate. The mixture is still stirred for some hours at 0–5° C. until the coupling is complete.

The pH-value of the coupling mixture obtained in this manner which contains the monoazo dyestuff of the following formula

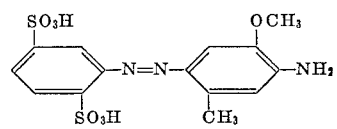

is then adjusted to 6.0–6.5 by means of sodium carbonate and the mixture diluted with 750 parts by volume of water. The almost clear solution obtained is filtered, 25 parts of 37% hydrochloric acid are added, causing the formation of a thick precipitate, and the aminoazo dyestuff is diazotized at 0–5° C. with an aqueous solution of 6.9 parts of sodium nitrite. The pH-value of the diazo mixture is then adjusted to 5–6 by means of sodium bicarbonate. For the preparation of the disazo dyestuff the mixture is reacted with a cold neutral solution of 56.5 parts of the coupling component of the following formula

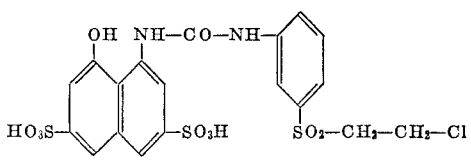

prepared as described in Example 1, in 700 parts by volume of water. The coupling is terminated at a pH-value of 6–7, the precipitation of the disazo dyestuff formed is completed by addition of sodium chloride, and the precipitate filtered with suction and dried.

The dyestuff obtained which in the form of the free acid corresponds to the following formula

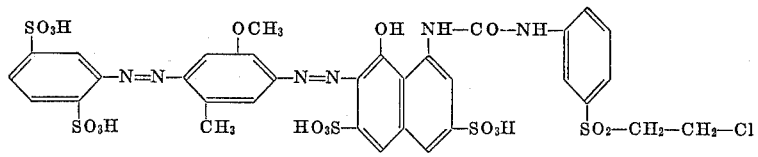

produces navy blue dyeings and prints on cotton.

Example 14

37.5 parts of the red dyestuff of the formula

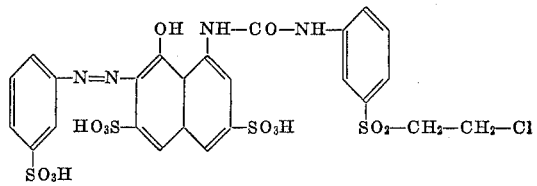

which is specified in the table following Example 2, are dissolved in 1,500 parts by volume of water to give a neutral solution. 22.5 parts of copper sulfate containing crystal water and 22.5 parts of anhydrous sodium acetate are added, and 11.3 parts of 35% hydrogen peroxide solution are dropped into the metallization mixture within one hour at a pH-value of 5.0–5.2 and at a temperature of 20–25° C. In order to complete the oxidative coppering the batch is stirred for another 12 hours approximately, the metallized dyestuff is salted out with sodium chloride, filtered with suction, washed with a dilute aqueous sodium chloride solution and dried at 50° C. under reduced pressure. The copper complex dyestuff obtained produces reddish violet prints and dyeings on cotton having a good fastness to light and to wetting.

Example 15

50 parts of the monoazo dyestuff of the following formula

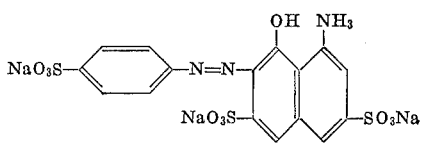

which is obtained by coupling equivalent amounts of diazotized 1-aminobenzene-4-sulfonic acid and of 1-amino-8-hydroxy-naphthalene-3,6-disulfonic acid in an alkaline medium, are dissolved in 400 parts by volume of water, the solution of 50 parts of 3-(β-chloroethylsulfonyl)-phenyl-1-isocyanate in 100 parts of chlorobenzene is added at 20° C. and the reaction mixture is stirred for about 12 hours at a pH-value of 6.5–7.0.

After dilution with 500 parts by volume of water and addition of 20 parts of kieselguhr the solution is clarified by filtration and the dyestuff formed salted out by addition of sodium chloride. In the form of the free acid the dyestuff corresponds to the following formula

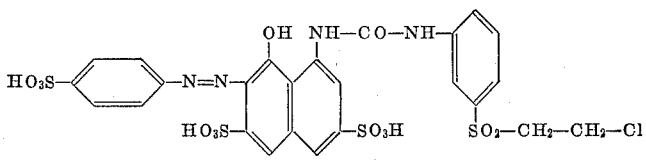

The precipitate is filtered with suction, washed with a dilute aqueous sodium chloride solution and dried at 50° C. In the presence of alkaline agents the dyestuff described yields clear, bluish red dyeings and prints on cotton which are fast to washing.

Example 16

34.7 parts of 1-(N-ethylamino)-8-hydroxynaphthylene-3,6-disulfonic acid are dissolved in 500 parts by volume of water while adding a 33% sodium hydroxide solution to give a neutral solution. A solution of 40 parts of 3-(β-chloroethylsulfonyl)-phenyl-1-isocyanate in 80 parts of chlorobenzene is added, and the reaction mixture is stirred for about 12 hours at room temperature and at a pH-value between 6.5 and 7.0. After addition of 10 parts of kieselguhr the solution is clarified by filtration and the product salted out with potassium chloride. The precipitated coupling component is separated from the liquid components of the mixture by filtration or decanting, washed with an aqueous potassium chloride solution and dissolved in 400 parts by volume of water. The solution obtained is cooled to 0–5° C. and combined with an ice-cold diazonium solution of 9.3 parts of aniline. The pH-value of the mixture is adjusted to 6.5–7.0 by means of sodium bicarbonate, and when the coupling is complete the product is salted out with potassium chloride. The dyestuff is filtered with suction and dried. In the form of the free acid it corresponds to the following formula

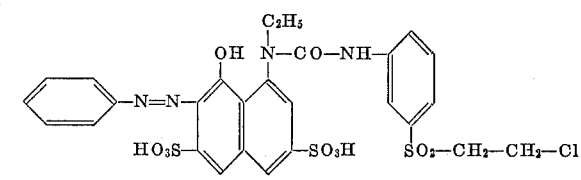

It dyes and prints cotton clear red shades of good wet fastness properties.

Example 17

18.9 parts of 2-amino-1-hydroxybenzene-4-sulfonic acid are dissolved in 250 parts by volume of water, while adding sodium hydroxide solution to give a neutral solution. 25 parts of 37% hydrochloric acid and 100 parts of ice are added, and the whole is diazotized at 0–5° C. with an aqueous solution of 6.9 parts of sodium nitrite. The pH-value of the diazonium mixture is adjusted to 4–5 by means of sodium carbonate, and the diazo solution is introduced, while thoroughly stirring, into a cold solution of 31.9 parts of 1-amino-8-hydroxynaphthalene-3,6-disulfonic acid in 100 parts by volume of water, to which have been added 15 parts of sodium carbonate after neutralization. The coupling takes place very rapidly. After stirring for another 5 hours the pH-value of the coupling mixture is adjusted to 6–7 by means of hydrochloric acid. Subsequently, sodium chloride is added and the precipitated dyestuff which in the form of the free acid corresponds to the formula

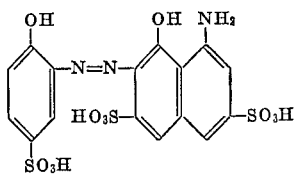

is filtered with suction.

For the metallization the moist filter cake obtained in this manner is dissolved in 500 parts by volume of water, 14 parts of cobalt sulfate containing crystal water are added, and the pH-value of the solution is adjusted to 5.5–6.0 by addition of sodium carbonate. The metallization mixture is then stirred at room temperature for about 12 hours in the course of which the 1:2-cobalt complex of the above monoazo dyestuff is formed. The end of the reaction can be easily recognized by chromatography on paper.

The pH-value of the solution of the cobalt complex dyestuff is adjusted to 6.5–6.8 by addition of sodium carbonate and a solution of 30 parts of 3-(β-chloroethylsulfonyl)-phenyl 1-isocyanate in 60 parts of chlorobenzene is added. After stirring for 12 hours at room temperature and at a pH-value of 6.5–6.8 and after addition of 10 parts of kieselguhr the solution is clarified by filtration and the filtrate is concentrated to dryness by evaporation in vacuo at 50° C. The metal complex dyestuff is thus isolated in the form of a powder. In the metal-free and acid form the 1:2-cobalt complex dyestuff corresponds to the following formula

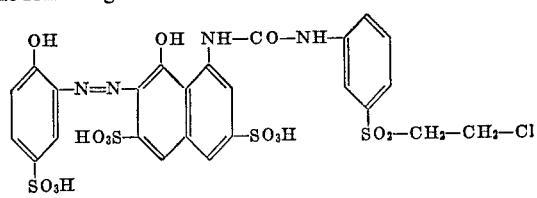

It produces violet prints on cotton.

When using 25 parts of chromium alum instead of cobalt sulfate, heating during the metallization to 85–90° C. and proceeding as described above there is obtained the 1:2-chromium complex of the dyestuff of the formula given above. This dyestuff can be salted out with potassium chloride and yields navy blue prints on cotton.

Example 18

When using in Example 2 instead of 1-amino-8-hydroxynaphthalene-4,6-disulfonic acid the same amount of 1-amino-8-hydroxynaphthalene-3,6-disulfonic acid a coupling component is obtained which in the form of the free acid corresponds to the following formula

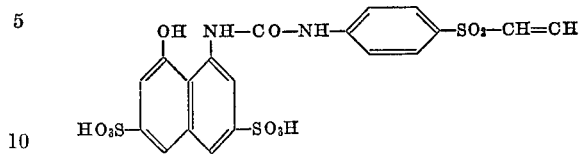

52.9 parts of the coupling component of the above formula are dissolved in the form of the disodium salt in 350 parts of water to give a neutral solution and heated to 70–75° C. At this temperature 27.5 parts of sodium thiosulfate containing crystal water are added while stirring, the pH-value being maintained within the range from 5.8 to 6.3 by dropping in 50% acetic acid. Stirring is continued for 3 hours at the above pH-value and temperature, then the product is salted out at room temperature by means of sodium chloride, filtered with suction and washed with a dilute aqueous sodium chloride solution.

The moist filter residue is dissolved in 350 parts of water and coupled at a pH-value of 6–7 with the diazonium salt solution of 9.3 parts of aniline. A dyestuff is obtained which in the form of the free acid corresponds to the following formula

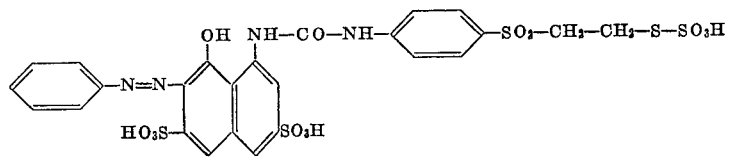

The dyestuff is salted out with sodium chloride, filtered with suction and dried in vacuo at 40° C.

In the presence of acid-binding agents the dyestuff dyes cotton red shades of good wet fastness properties.

When dissolving 52.9 parts of the above coupling component in the form of the disodium salt in 350 parts of water to give a neutral solution, adding 14 parts of diethylamine, keeping the temperature of the batch within the range from 20° to 30° C. and the pH-value for 4 hours between 10.5 and 11.0 by addition of sodium hydroxide solution, salting out the product with sodium chloride, washing the filtered precipitate with sodium chloride solution and coupling the solution of the moist filter residue in 350 parts of water at a pH-value of 6.5–7.0 with the diazonium salt of 17.3 parts of 1-aminobenzene-4-sulfonic acid, a dyestuff is obtained which in the form of the free acid corresponds to the following formula

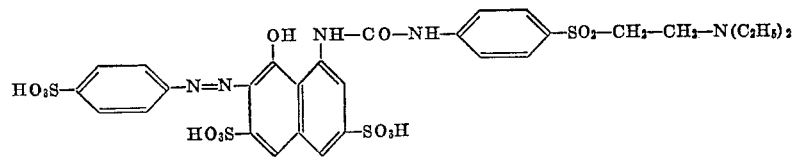

In the presence of an alkali, for example sodium carbonate or sodium hydroxide, the dyestuff yields red prints on cotton which are fast to wet processing.

Example 19

(a) 319 parts of 1-amino-8-hydroxynaphthalene-3,6-disulfonic acid are dissolved in 1,500 parts of water while adding 33% sodium hydroxide solution to give a neutral solution. At 40° C. a warm solution of 296 parts of 3-(β- chloroethylsulfonyl)phenyl-1-isocyanate in 650 parts of chlorobenzene is introduced while stirring and the batch is stirred at a pH-value of 6–7 until the 1-amino-8-hydroxynaphthalene-3,6-disulfonic acid has completely reacted. The chlorobenzene is then removed from the reaction mixture by distillation in vacuo.

(b) 303 parts of 2-aminonaphthalene-1,5-disulfonic acid are mixed by stirring with 1,000 parts of water, 2,000 parts of ice and 150 parts of 37% hydrochloric acid are added, and the whole is diazotized at 0–5° C. by treatment with 173 parts of 40% sodium nitrite solution. After about 30 minutes a slight excess of nitrite is decomposed by means of amidosulfonic acid. Then the solution of the coupling component obtained according to (a) which is free from chlorobenzene and has a temperature of about 20° C. is added, and the pH-value of the coupling mixture is adjusted to 6.5–7.0 by addition of saturated aqueous sodium carbonate solution and maintained at this value. When the coupling is complete the mixture is diluted to 12,000 parts by volume by addition of water, filtered, and sodium chloride is added to the filtrate. The precipitated dyestuff which in the form of the free acid corresponds to the following formula

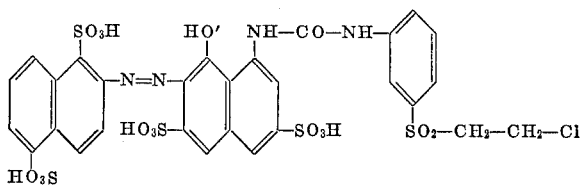

is filtered with suction, washed with dilute aqueous sodium chloride solution and dried at 60° C.

When applied to cotton the dyestuff yields brilliant bluish red dyeings and prints showing good wet fastness properties and in particular a good fastness to bathing water containing chlorine.

For isolating the dyestuff it is also possible to liberate the filtrate, obtained according to (b) subsequent to the coupling, from water by spray-drying instead of adding sodium chloride to it.

Example 20

When using, in Example 19 instead of 296 parts of 3-(β-chloroethylsulfonyl)-phenyl-1-isocyanate 335 parts of 3-(β-acetatoethyl-sulfonyl)-phenyl-1-isocyanate (viscous substance) and proceeding further as described in said example a dyestuff is obtained which in the form of the free acid corresponds to the following formula

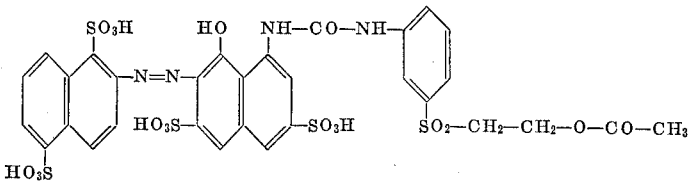

and which is equal to the dyestuff of Example 19 as regards properties and shade.

Example 21

When using in Example 19 instead of 303 parts of 2-aminonaphthalene-1,5-disulfonic acid 303 parts of 2-aminonaphthalene-6,8-disulfonic acid and continuing the operation as described a dyestuff is obtained which in the form of the free acid corresponds to the following formula

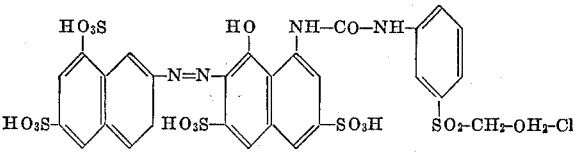

The dyestuff produces clear, bluish red dyeings and prints on cotton which are fast to wet processing.

Example 22

44 parts of the dyestuff of the formula given in Example 21 are mixed by stirring with 1,000 parts of water, and 22.5 parts of copper sulfate containing crystal water are added. The pH-value of the mixture is adjusted to 5.0–5.2 by addition of sodium acetate, and within 2 hours, at 20–25° C., 11.3 parts of a 35% hydrogen peroxide solution are dropped in, the pH-value being maintained by further addition of sodium acetate. The batch is stirred overnight, the complex compound salted out with sodium chloride and the precipitated dyestuff, which in the form of the free acid corresponds to the following formula

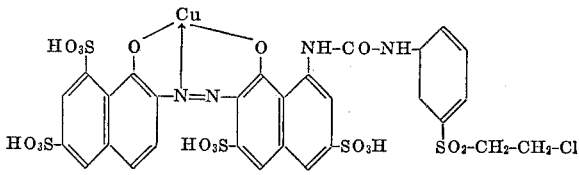

is filtered. The filter residue is washed with a dilute aqueous sodium chloride solution and dried in vacuo at 60° C.

There is obtained a dark blue dyestuff powder which yields blue dyeings and prints on cotton, having good properties of wet fastness and an excellent fastness to light.

Example 23

(a) 319 parts of 1-amino-8-hydroxynaphthalene-3,6-disulfonic acid are dissolved in 1,500 parts of water while adding 33% sodium hydroxide solution to give a neutral solution. A solution of 335 parts of 3-(β-acetatoethyl-sulfonyl)-phenyl-1-isocyanate in 650 parts of chlorobenzene is added with stirring and stirring is continued at a pH-value of 6–7 until the 1-amino-8-hydroxynaphthalene-3,6-disulfonic acid has reacted. The chlorobenzene is then removed from the reaction mixture by distillation in vacuo.

(b) 93 parts of aniline are added to a mixture consisting of 200 parts of water, 500 parts of ice and 250 parts of 37% hydrochloric acid and the whole is diazotized at 0–5° C. by treatment with 173 parts of 40% sodium nitrite solution. After about 30 minutes a slight excess of nitrite is destroyed by addition of amidosulfonic acid. The solution of the coupling component, obtained according to (a), which is free from chlorobenzene is introduced and the temperature of the reaction mixture is kept below 5° C. by addition of 1,000 parts of ice. The pH-value of the coupling mixture is then adjusted to 6.5–7.0, at 0–5° C., by means of saturated aqueous sodium carbonate solution and, when the coupling is complete, diluted to 12,000 parts by volume by addition of water. The solution is clarified at 20–30° C. by filtration and the dyestuff, which in the form of the free acid corresponds to the following formula

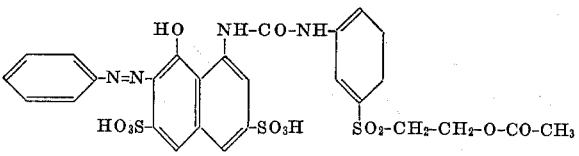

is salted out with sodium chloride. The precipitated dyestuff is filtered with suction, washed with an aqueous sodium chloride solution and dried. It produces brilliant red dyeings and prints on cotton, having good properties of wet fastness.

Example 24

When using in Example 5 instead of 11.1 parts of 2-aminonaphthalene-1-sulfonic acid 15.1 parts of 2-aminonaphthalene-1,5-disulfonic acid and proceeding further as described in said example, there is obtained a dyestuff which in the form of the free acid corresponds to the following formula

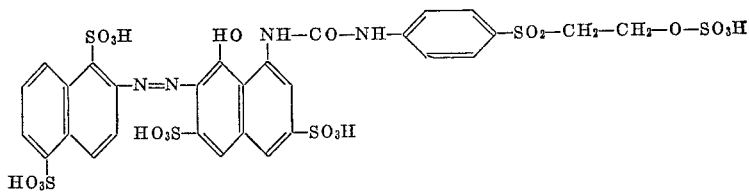

The product dissolves excellently in water and yields clear bluish red dyeings and prints on cotton, having good properties of wet fastness and, in particular, a good fastness to bathing water containing chlorine.

Example 25

(a) 159.5 parts of 1-amino-8-hydroxynaphthalene-3,6-disulfonic acid are dissolved in 750 parts of water while adding sodium hydroxide solution to give a neutral solution. A solution of 148 parts of 3-($\beta$-chloroethylsulfonyl)-phenyl-1-isocyanate in 325 parts of chlorobenzene of about 40° C. is added while stirring, and stirring is continued at a pH-value of 6–7 until practically all the 1-amino-8-hydroxynaphthalene - 3,6-disulfonic acid has reacted. The chlorobenzene is then removed from the mixture by distillation in vacuo, the solution clarified at 40–50° C. by filtration and then cooled to 10–15° C. 121 parts of 33% sodium hydroxide solution are added, and the batch is stirred for 15 minutes at 10–15° C. Subsequently the pH-value of the solution is adjusted to 5.8–6.3 by means of hydrochloric acid, 130 parts of sodium thiosulfate containing crystal water are introduced at 70–75° C., the pH-value being maintained by dropwise addition of glacial acetic acid. The reaction mixture is stirred at 70–75° C. for another 3 hours approximately, and then cooled to room temperature. By addition of sodium chloride the coupling component of the following formula

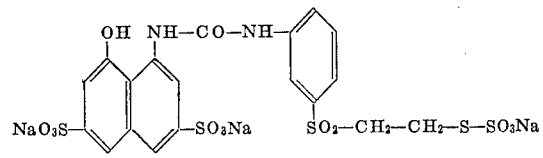

is separated. The precipitate is filtered with suction and washed with a dilute aqueous sodium chloride solution.

(b) The moist filter residue obtained in this manner is mixed by stirring with 2,000 parts of water and 500 parts of ice and combined with the diazonium salt of 111.5 parts of 2-aminonaphthalene-1-sulfonic acid. The coupling mixture is neutralized by means of sodium carbonate solution and the coupling is allowed to terminate at 10–20° C. and at a pH-value of 6–7. The dyestuff, which in the form of the free acid corresponds to the following formula

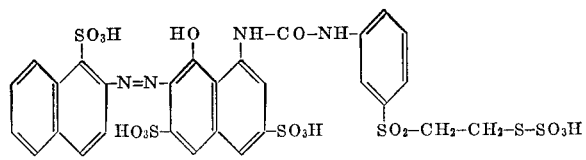

is salted out with sodium chloride, filtered with suction, washed with a dilute aqueous sodium chloride solution and dried. It dyes and prints cotton clear, bluish red shades which are distinguished by good properties of wet fastness and, in particular, by a good fastness to bathing water containing chlorine.

Example 26

When using in Example 25(b) instead of 111.5 parts of 2-aminonaphthalene - 1-sulfonic acid 151.5 parts of 2-aminonaphthalene - 1,5-disulfonic acid and proceeding further as described in said example, there is obtained a dyestuff which in the form of the free acid corresponds to the following formula

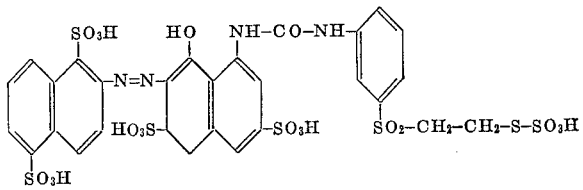

It dyes cotton bluish red shades distinguished by good properties of wet fastness, in particular by a good fastness to bathing water containing chlorine.

Example 27

(a) 217 parts of 2-amino - 5-sulfobenzene-carboxylic acid are dissolved in 2,000 parts of water while adding concentrated sodium hydroxide solution to give a neutral solution and the whole is poured while stirring onto 2,000 parts of ice and 240 parts of 37% hydrochloric acid. Subsequently, the amino component is diazotized at 0–5° C. by treatment with 173 parts of 40% sodium nitrite solution, about 30 minutes after the last addition of nitrite the slight excess of nitrite is destroyed by means of amidosulfonic acid and the excess acid is neutralized by dropwise addition of saturated aqueous sodium carbonate solution. Then the solution of the coupling component obtained according to Example 19(a) from 319 parts of 1-amino - 8-hydroxynaphthalene - 3,6-disulfonic acid and 296 parts of 3-($\beta$-chloroethylsulfonyl)-phenyl - 1-isocyanate and which is free from chlorobenzene is added, and the mixture is stirred at a pH-value of 6.5–7.0 until the coupling is complete.

The batch is then diluted with water to 19,000 parts by volume, filtered and to the filtrate obtained 3,800 parts of sodium chloride are slowly added. The precipitated dyestuff which in the form of the free acid corresponds to the following formula

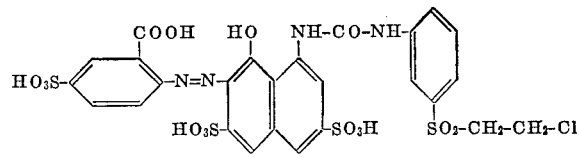

is filtered with suction, washed with dilute aqueous sodium chloride solution and dried at 60° C. in vacuo. It yields brilliant red dyeings and prints on cotton which are fast to wetting.

(b) 79.3 parts of the dyestuff of the formula given in paragraph (a) are stirred into 2,000 parts of water, 25 parts of copper sulfate containing crystal water are added, and the pH-value is adjusted to 5.0–5.5 by means of concentrated sodium carbonate solution. The mixture is stirred for 2 hours at 50–60° C., sodium chloride is added at room temperature, the precipitated dyestuff is filtered with suction, washed with an aqueous sodium chloride solution and the filter residue dried. The copper complex dyestuff obtained produces clear, reddish violet dyeings and prints on cotton.

(c) 79.3 parts of the dyestuff of the formula given in paragraph (a) are stirred into 1,000 parts of water, 25 parts of chromium alum are added, and the pH-value is adjusted to 5.5–6.0 by means of concentrated sodium carbonate solution. The mixture is then heated at this pH-value for 8 hours to 90–95° C., while stirring, subsequently the solution is clarified at room temperature by filtration, and the 1:2-chromium complex dyestuff formed is isolated by spray-drying. It yields bluish violet prints on cotton.

Example 28

98 parts of the disazo dyestuff of the formula given in Example 13 are stirred thoroughly in 650 parts of water, 30 parts of anhydrous sodium acetate, 32 parts of glacial acetic acid and 43 parts of copper sulfate containing crystal water are added, and the batch is heated to the boil under reflux for about 10 hours, while stirring. The reaction mixture is clarified by filtration, and sodium chloride is added at room temperature. The precipitated dyestuff which in the form of the free acid corresponds to the following formula

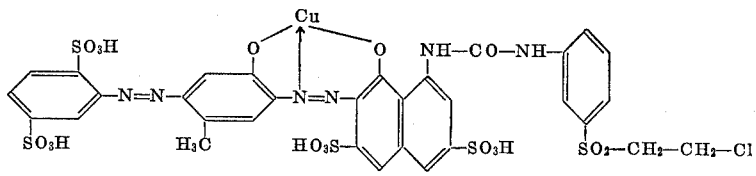

is filtered with suction, washed with sodium chloride solution and dried. It yields blue dyeings and prints on cotton.

Example 29

When using in Example 8 instead of 12.5 parts of copper sulfate 14.1 parts of nickel sulfate containing crystal water and proceeding further as described in said example, there is obtained a metal complex dyestuff which in the form of the free acid corresponds to the following formula

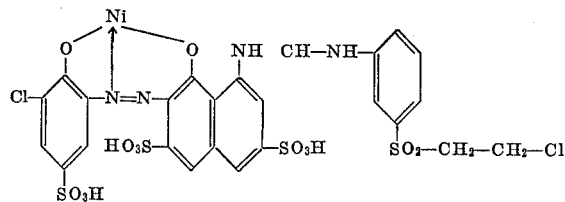

The product dyes cotton reddish violet shades.

We claim:

1. Azo-dyestuff of the formula

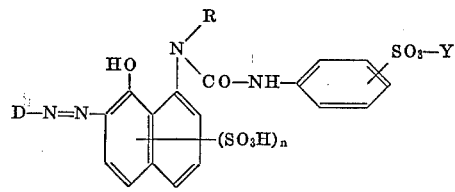

wherein D represents
(a) benzene or benzene substituted by 1 to 3 members selected from the group consisting of chlorine, lower alkyl, lower alkoxy, hydroxy, nitro, acetylamino, carboxylic acid, carboxylic acid N-sulfophenylamide and sulfonic acid amide,
(b) benzene sulfonic acid, benzene disulfonic acid or benzene sulfonic acid substituted by 1 or 2 members selected from the group consisting of chlorine, lower alkyl, lower alkoxy, hydroxy, carboxylic acid, trifluoromethyl, nitro, acetylamino and 2,4-dichlorotriazinyl-6-amino,
(c) naphthalene substituted by 1 to 3 sulfonic acid groups, hydroxynaphthalene sulfonic acid or hydroxynaphthalene disulfonic acid,
(d) azo-benzene sulfonic acid, azobenzene disulfonic acid, or azobenzene disulfonic acid substituted by lower alkyl and lower alkoxy,
(e) azonaphthalene substituted by 1 to 3 sulfonic acid groups,
(f) phenylazonaphthalene substituted by 1 to 3 sulfonic acid groups,
(g) diphenyl sulfonic acid,
(h) diphenylamine, diphenylamine sulfonic acid or acetylaminodiphenylamine sulfonic acid,
(i) dehydrothiotoluidine sulfonic acid or dehydrothiotoluidine disulfonic acid,
(j) nitrostilbene disulfonic acid, or
(k) pyrene disulfonic acid R represents hydrogen or lower alkyl, $n$ stands for 1 or 2, Y is —CH=CH$_2$, —CH$_2$—CH$_2$Cl,
—CH$_2$—CH$_2$—O—CO—CH$_3$
—CH$_2$—CH$_2$—O—SO$_3$H
—CH$_2$—CH$_2$—S—SO$_3$H, —CH$_2$—CH$_2$O-phenyl or —CH$_2$—CH$_2$—N(lower alkyl)$_2$, or complex copper, nickel, chromium or cobalt compounds thereof wherein the radial D contains a hydroxy or carboxylic acid group in ortho-position to the azo-linkage.

2. The azo-dyestuff of the formula

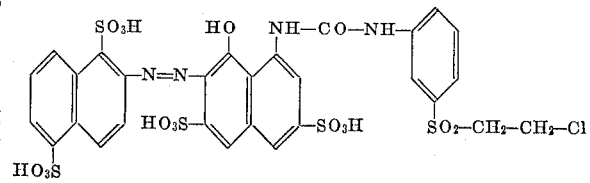

3. The azo-dyestuff of the formula

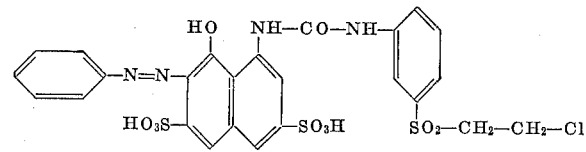

4. The azo-dyestuff of the formula

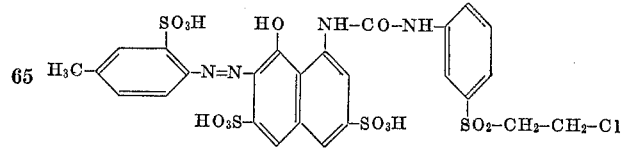

5. The azo-dyestuff of the formula

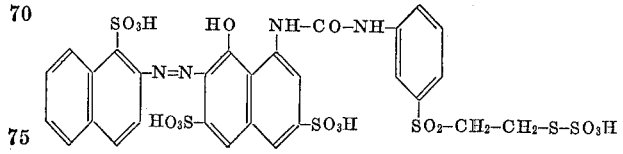

6. The azo-dyestuff of the formula
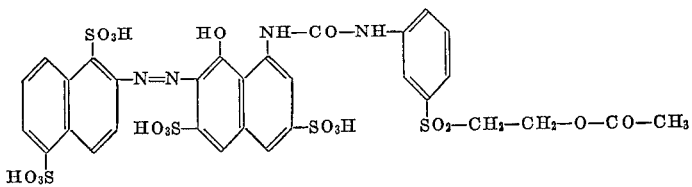
7. The azo-dyestuff of the formula
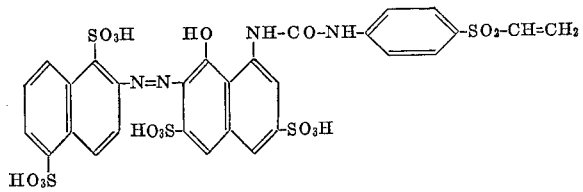
8. The azo-dyestuff of the formula
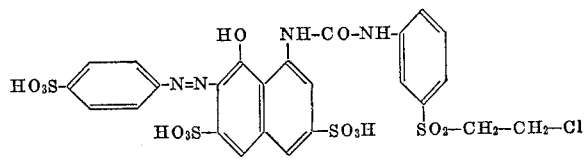
9. The azo-dyestuff of the formula
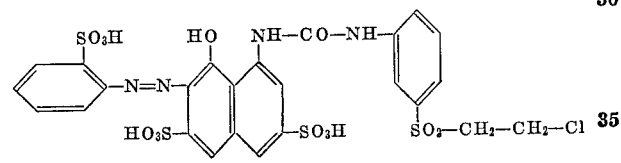
10. The azo-dyestuff of the formula
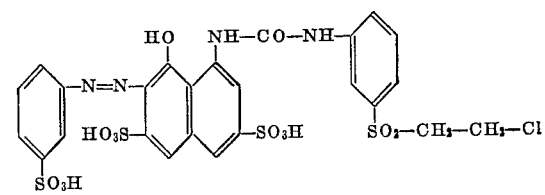
References Cited
UNITED STATES PATENTS
3,097,096  7/1963  Feeman _____ 260—151 X
3,135,730  6/1964  Heyna et al. _____ 260—149 X
FLOYD D. HIGEL, *Primary Examiner.*
U.S. Cl. X.R.
260—37, 149, 150, 151, 153, 158, 187, 193, 199, 453, 471, 488, 506; 8—4, 13, 41, 42, 43, 50, 51